United States Patent [19]

Fitzpatrick

[11] Patent Number: 4,593,288
[45] Date of Patent: Jun. 3, 1986

[54] AIRBORNE EARLY WARNING SYSTEM WITH RETRACTABLE RADOME

[75] Inventor: Roger S. Fitzpatrick, Somerset, England

[73] Assignee: Marconi Avionics Limited, England

[21] Appl. No.: 529,650

[22] Filed: Sep. 6, 1983

[30] Foreign Application Priority Data

Sep. 3, 1982 [GB] United Kingdom ................ 8225158

[51] Int. Cl.$^4$ ............................................ H01Q 1/28
[52] U.S. Cl. ................... 343/705; 244/118.1; 343/872
[58] Field of Search ............... 343/705, 872, 757, 761, 343/762, 765, 766; 244/118.1, 118.2, 118.5, 102 R, 129.5, 137 A, 137 R

[56] References Cited

U.S. PATENT DOCUMENTS

| | | | |
|---|---|---|---|
| 2,702,346 | 2/1955 | Evans et al. | 343/872 |
| 2,984,834 | 5/1961 | Howard, Jr. et al. | 343/705 |
| 3,478,904 | 11/1969 | Courter | 244/137 R |
| 3,656,164 | 4/1972 | Rempt | 343/705 |
| 3,803,614 | 4/1974 | Reid | 343/705 |
| 3,984,837 | 10/1976 | Tatnall | 343/705 |
| 4,188,631 | 2/1980 | Dougherty et al. | 343/705 |
| 4,458,864 | 7/1984 | Colombo et al. | 244/118.5 |

FOREIGN PATENT DOCUMENTS

| | | |
|---|---|---|
| 700106 | 11/1953 | United Kingdom ................ 343/705 |
| 740174 | 11/1955 | United Kingdom . |

OTHER PUBLICATIONS

Westland Sea King Helicopter with AEW Radar, EMI Searchwater, 1982.
*International Defense Review,* Jan. 1979, p. 115.

Primary Examiner—Eli Lieberman
Assistant Examiner—Michael C. Wimer
Attorney, Agent, or Firm—Kirschstein, Kirschstein, Ottinger & Israel

[57] ABSTRACT

A radar scanner unit for an airborne early warning system comprises an aerodynamic radome pod (1) pivotally mounted on a pylon (2) which is in turn pivotally mounted on a framework (19). The pod (1) can be retracted towards the framework (19) and the unit can be bodily fitted via a standard cargo loading aperture into the fuselage of an aircraft. In flight, the pod (1) can be deployed from and retracted into the aircraft fuselage via the cargo-loading aperture, doors (3) being arranged to fit round the pylon (2) when the pod (1) is deployed.

7 Claims, 17 Drawing Figures

FEET

AIRBORNE EARLY WARNING SYSTEM WITH RETRACTABLE RADOME

This invention relates to airborne early warning (AEW) systems and to radar scanners used in such systems.

It is known to mount radar scanners in the front and rear of aircraft to obtain 360° of azimuth coverage, the forward scanner covering 180° ahead and the rear scanner similarly covering the rear 'view'. Such arrangements are effective but require substantial modification of the aircraft frame to accommodate the scanners and radomes. Duplication of the scanner in this way also imposes a significant weight liability.

In conjunction with such a twin scanner system it is the practice to build in all of the AEW system equipment integrating it with the aircraft structure. This process takes a consierable amount of time during which the aircraft is unavailable for any other use. When finally installed the system and aircraft are tested as an integrated unit. After successful testing the result is a specialised aircraft having the exclusive function of providing an airborne early warning facility.

One object of the invention is to provide a radar scanner which obviates at least some of the above disadvantages.

According to one aspect of the present invention, a radar scanner unit for an airborne early warning system is adapted to be bodily fitted via a loading aperture into an aircraft fuselage and comprises a supporting framework, a radar scanner housed within an aerodynamic radome pod, the pod being pivotally mounted on the supporting framework, and driving means connected to the pod and to the framework, said driving means being arranged to pivotally extend the pod from, and retract the pod towards the framework, such that when the unit is so fitted in the aircraft fuselage, the pod can be extended from and retracted into the aircraft fuselage via said aperture in flight of the aircraft.

Said aperture may be a cargo-loading aperture or may be cut into the fuselage at any suitable location. The aircraft may be a fixed-wing aircraft or a helicopter.

The pod is preferably pivotally mounted on a pylon which is in turn pivotally mounted on the framework, the arrangement being such that the pod can be moved between said positions while substantially maintaining its attitude with respect to the framework.

The framework may be part of, or may be fixed to, a pressure bulkhead adapted to fit across the fuselage of an aircraft to isolate the scanner region from the remainder of the fuselage.

A further object of a preferred form of the present invention is to provide an AEW system which can be fitted to a transport aircraft in a relatively short time as a substantially complete, operative system.

According to another aspect of the invention therefore, an airborne early warning system incorporates a radar scanner as aforesaid, personnel and equipment housing modules for the energisation of the radar scanner and the processing of information derived from it, all being fixed together for bodily loading on to an aircraft as an integral system. Such a system may be complete and operative except for the provision of cooling, power supplies and radio and E.S.M. aerials.

An AEW system including a radar scanner in accordance with the invention will now be described, by way of example, with reference to the accompanying drawings, of which:

FIG. 9a is a schematic side elevation of a pylon-mounted power and cooling system for the radar scanner;

FIG. 9b is a schematic front elevation of the power and cooling system shown in FIG. 9a;

FIG. 11a is a diagrammatic side elevation of a fixed-wing aircraft with the scanner pod deployed, illustrating the elevation coverage of the scanner;

FIG. 11b is a rear elevation of the aircraft of FIG. 11a;

FIG. 11c is a diagrammatic side elevation of a rotodome carried by a helicopter illustrating the elevation coverage of the scanner, FIG. 11d is a rear elevation of the helicopter of FIG. 11c.

The invention is particularly but not exclusively intended for application to transport aircraft of the standard configuration having a fuselage and rear loading doors. The scanner may be incorporated in an integrated AEW system which can be bodily loaded onto a transport aircraft as a substantially complete unit.

Figure 1:
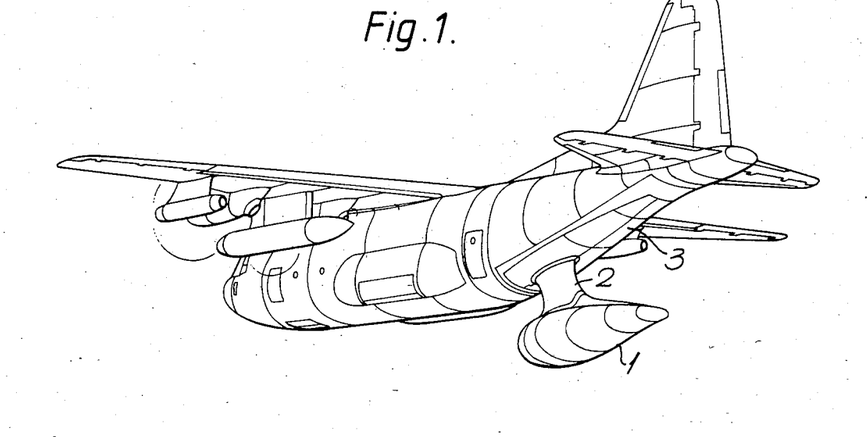
FIG. 1 is a perspective rear view of a Hercules transport aircraft incorporating a single radar scanner in a deployed condition.
Figure 2:
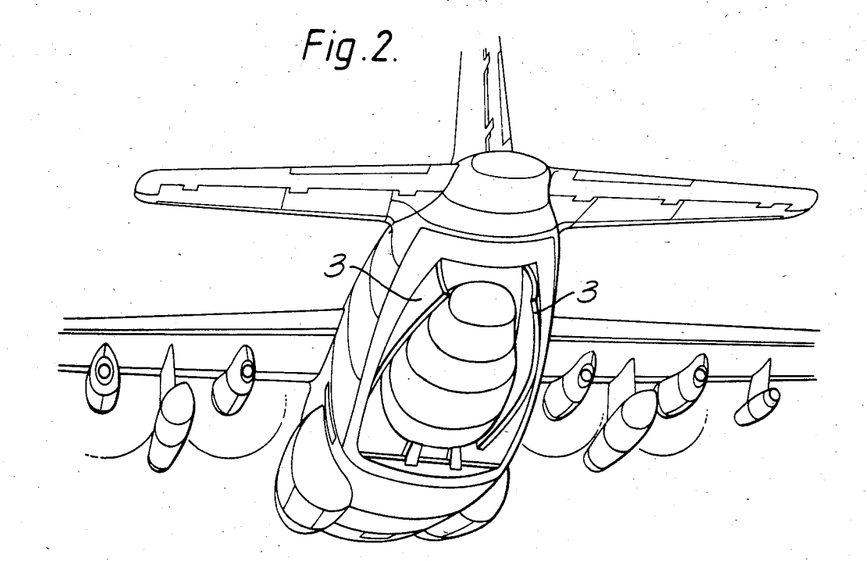
FIG. 2 is a similar view showing the radar scanner retracted.

FIGS. 1 and 2 show the scanner pod 1 respectively deployed and retracted from a Hercules transport aircraft. It can be seen that, in the deployed condition the doors close around the pylon 2 on which the pod is mounted, to leave a continuous aerodynamic surface. The doors 3 are modified from the standard hinged version, which open either as flaps in clam-like manner or else as ramps hinged about a transverse axis. The doors 3 illustrated in FIG. 2 roll back on each side within the fuselage. Thus they do not obstruct the pod stowed within the tail volume on opening and neither, incidentally, do they provide an excessive drag, as would 'clam' flaps in operation of the scanner.

The rolling doors have a 'cut-out' to accommodate the foot of the pylon when deployed, this being plugged by a small panel in normal (retracted pod) flight.

Figure 3:
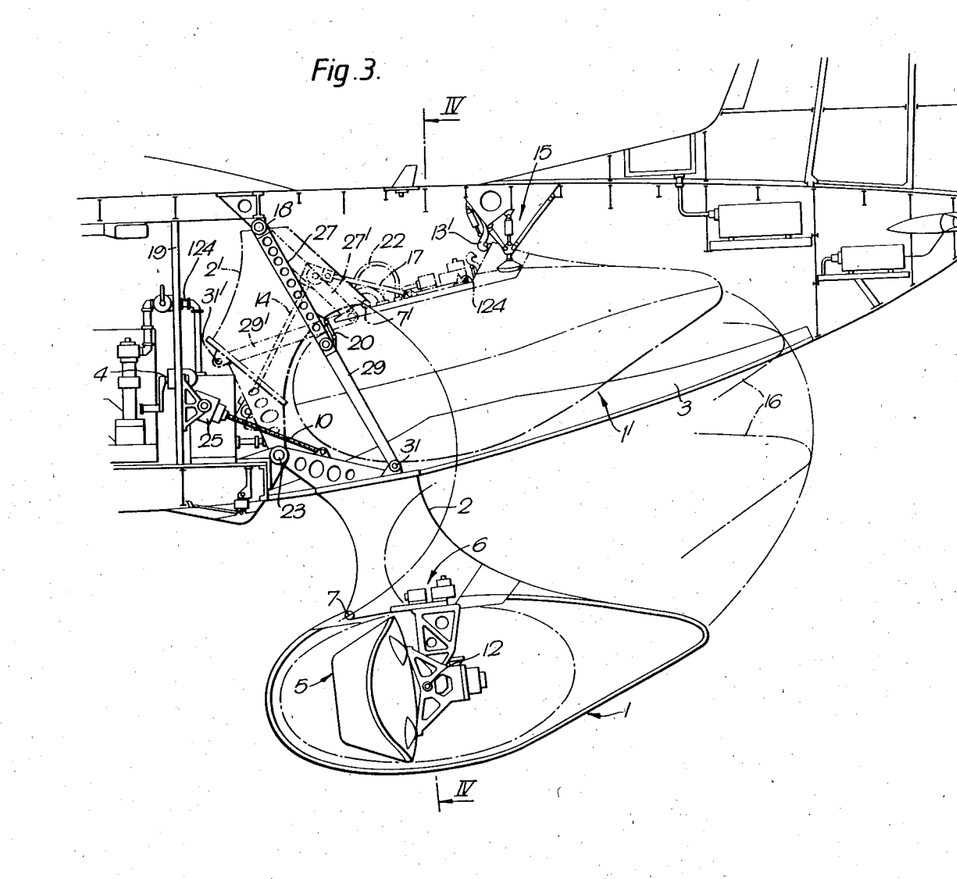
FIG. 3 is a sectional elevation of the rear end of a transport aircraft showing the radar scanner pod in both retracted and deployed conditions.

FIG. 3 shows the deployment mechanism for the pod. The pod 1 is shown in its deployed and retracted positions, those parts of the pod which are referenced in their deployed position being indicated by dashed reference numerals in their corresponding retracted positions. Radome pod 1 is aerodynamically shaped and houses a radar scanner 5 which can be rotated about 360° by drive mechanism 6 and tilted about horizontal axis 12. Pod 1 is hinged to pylon 2 (which is in the form of an aerodynamically shaped longitudinal fin) about an axis 7 and pylon 2 is in turn hinged to a supporting framework in the aircraft fuselage about axis 23. Pod 1 can be rotated relative to pylon 2 about axis 7 by a secondary lead screw 17 (which is shown in the retracted position only). Pylon 2 can be retracted into and deployed from the aircraft fuselage by rotation about axis 23 in response to drive exerted by a primary lead screw 10. A pivotally mounted torque motor 25 drives leadscrew 10 directly and simultaneously drives leadscrew 17 via an articulated coupling shaft 14, the drives being mechanically ganged to substantially maintain the pod in its aerodynamic orientation as it is deployed from or retracted into the fuselage, as indicated by dashed lines 16. Alternatively the drives may be ganged electrically. A manual drive 4 is coupled to the leadscrews and can be used to retract the pod in the event of failure of the torque motor 25 or jamming of the drive mechanism.

The downward pivotal travel of pylon 2 is limited by a toggle linkage comprising an upper strut 27 articulated to a lower strut 29. The toggle linkage is hinged to the rear of the pylon 2 at 31 at one end and the roof of the fuselage 18 at the other end. Prior to retraction of the pod, the toggle linkage is broken by a hydraulically-actuated toggle-breaking mechanism 20 and the linkage is then folded as shown at 27' and 29' as leadscrew 10 retracts the pylon 2. In its fully retracted position the pod 1 is secured to the roof of the fuselage by an array of nesting struts 15 and a latch 13. In order to minimise the stresses on doors 3, the rear of the fuselage is sealed and left depressurised by a jury pressure bulkhead 19. The entire radar scanner unit comprising pod 1, pylon 2, their associated drive mechanisms and radar equipment and bulkhead 19 can be loaded bodily into the aircraft fuselage via cargo doors 3. If necessary the unit can be in the form of a plurality of articulated modules which are provided with limited freedom of movement in order to avoid exerting strains on the aircraft fuselage, as will subsequently be described with reference to FIG. 6.

Figure 12:
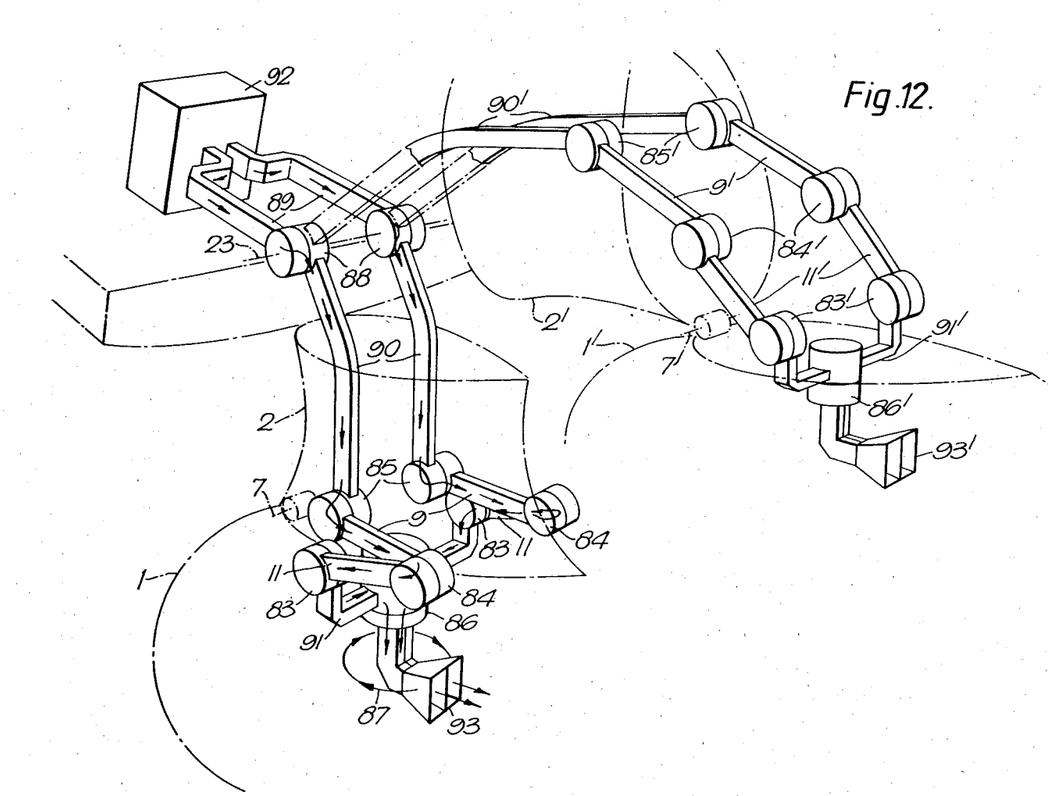
FIG. 12 is a schematic representation of a combined mechanism for locking the pad in its retracted position and forming microwave connections between a radar transmitter in the fuselage and the antenna in its deployed position.

Connections between the pod and the pylon are effected by flexible connectors such as 22, plug-in self-sealing connectors such as 124 and rotary waveguide connectors as shown in detail in FIG. 12.

FIG. 12 shows schematically a combined mechanism for locking the pod in its retracted position and forming microwave connections between a radar transmitter in the fuselage and the antenna in its deployed position. The mechanism comprises a substantial waveguide assembly consisting of pairs of waveguides 89, 90, 9, 11 and 91 which feed an antenna feed horn 93 from a transmitter/receiver 92 via swivel couplings 88, 85, 84, 83 and rotary coupling 86. The swivel couplings are conventional in form and are arranged to align the mouths of the waveguides in the deployed position (shown bottom left in FIG. 12). The rotary coupling 86 enables microwave power to be supplied to feed horn 93 over the full 360° rotary travel of the latter, as indicated by arrow 87.

In the retracted position (shown top right in FIG. 12) waveguide sections 9 and 11 are fully unfolded and act as a toggle linkage in conjunction with hinge 7. Since the pair of waveguide sections 90 are widely spaced apart, they provide lateral stiffness for the pylon assembly in flight. If necessary the attitude reference (not shown) for the antenna system may be mounted in the pod or pylon rather than the fuselage, in order to avoid errors caused by flexing of the pylon 2.

The normal rear loading doors of a transport aircraft have to be removed and replaced by the doors 3 mentioned above. For this purpose a new door 'frame' or in-fill panel 33, is fitted to the existing aperture shown in broken lines 35 in FIG. 4. The new door aperture 37 is shown solid and the new roll-back doors 3 are shown in their open position in double broken lines 39.

It may be necessary or convenient that the surface contour of the new doors is more bulbous than existing flat ramp doors, in order to accommodate the retracted pod. It may then happen that the overall drag is reduced.

Figure 4:
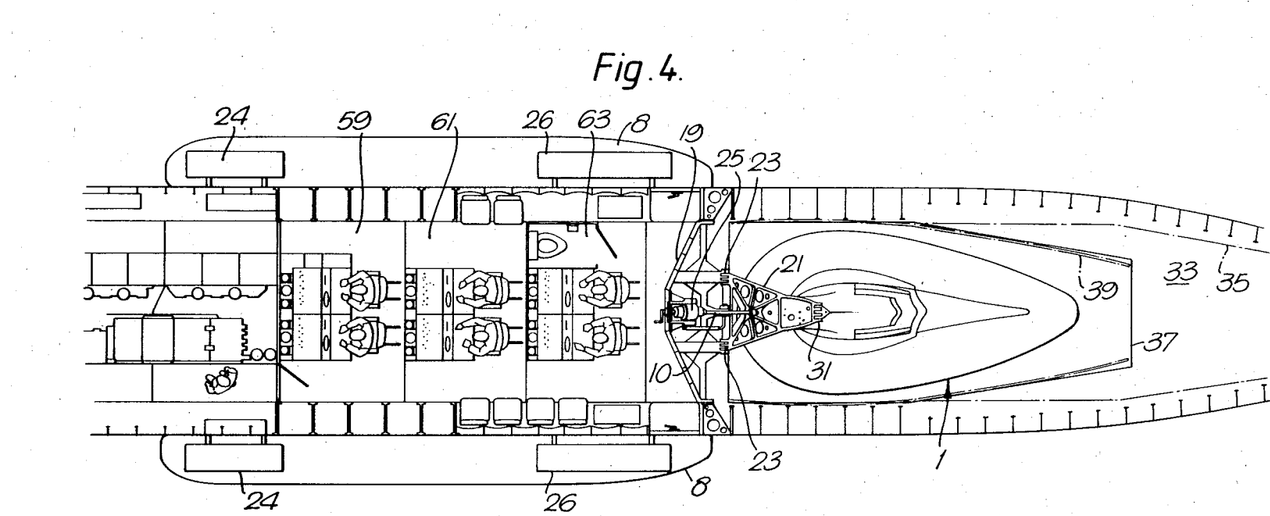
FIG. 4 is a top sectional plan view of the retracted scanner pod.
Figure 5:
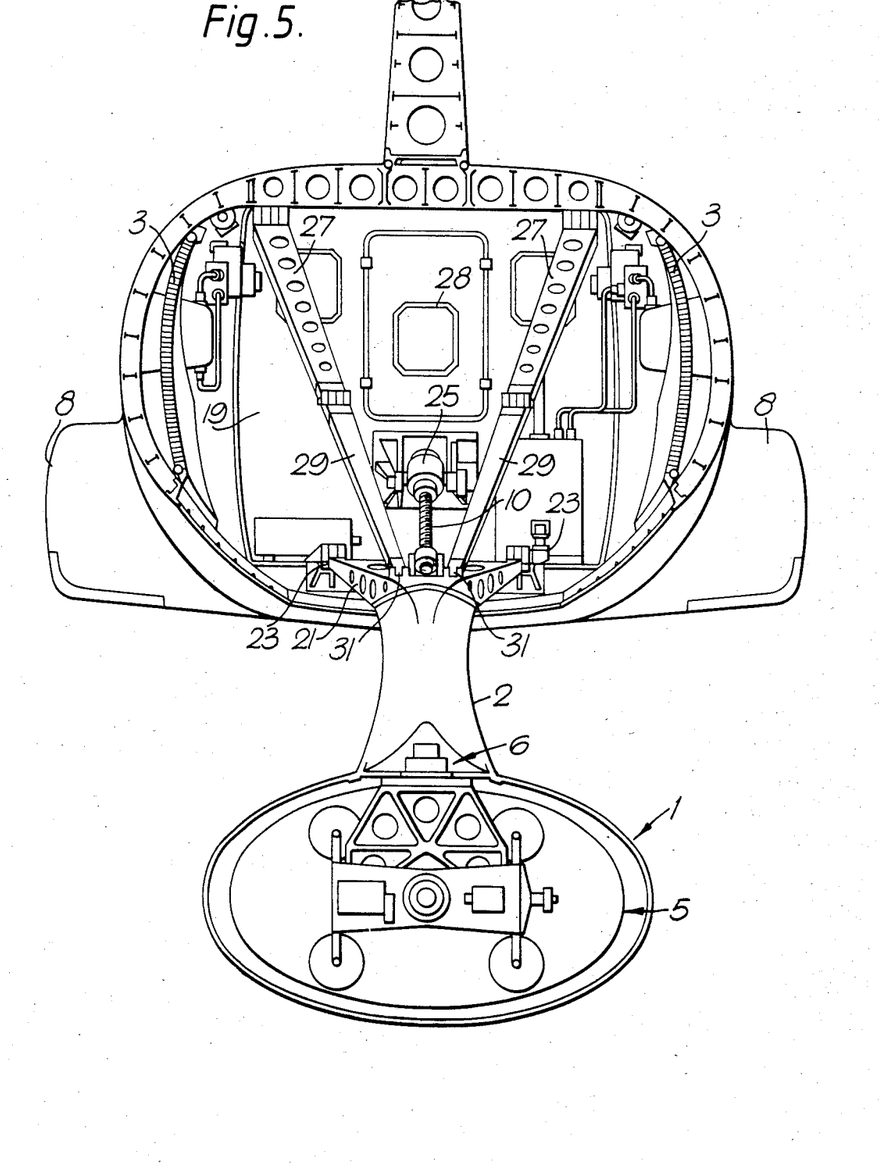
FIG. 5 is a rear elevation of the aircraft showing the pod deployed and also showing part of the supporting link mechanism.

Since a typical cargo aircraft into which the scanner unit is likely to be fitted will not have sufficient cooling capacity or power generation capacity for a radar system, external blisters 8 housing heat exchangers 24 and auxiliary power units 26 may be attached to the exterior of the fuselage, as shown in FIGS. 4 and 5. An observation window 28 (FIG. 5) is provided in bulkhead 19 in order to observe the position of pod 1.

Figure 10:
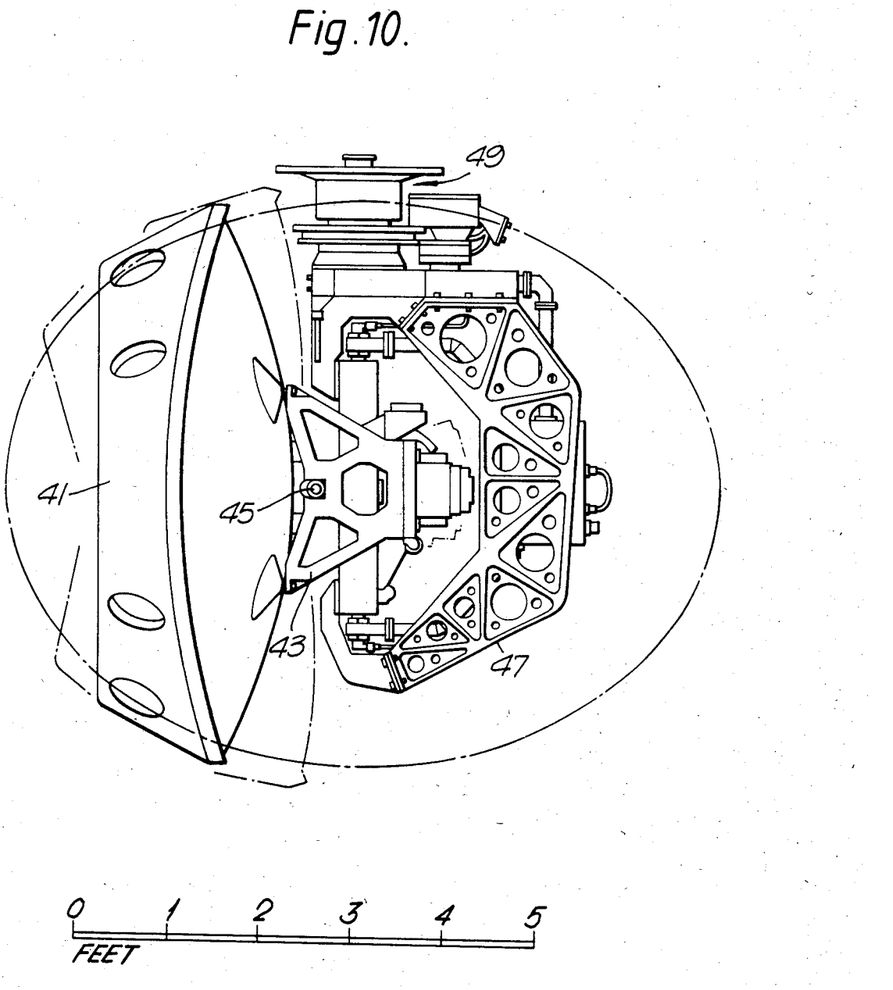
FIG. 10 is a side elevation of the radar scanner in the absence of the pod radome.
Figures 11A, 11B, 11C, 11D:
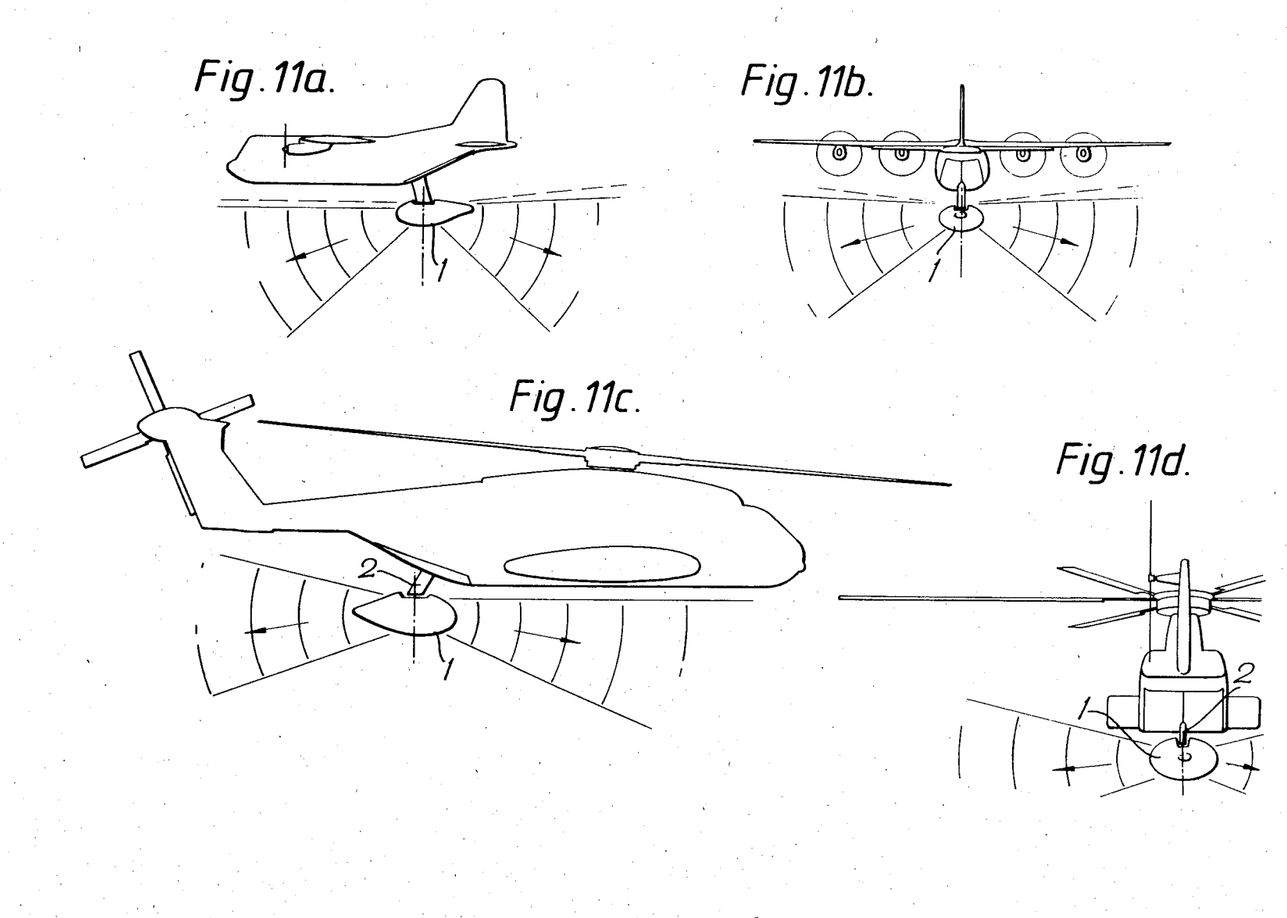

The scanner itself, shown in detail in FIG. 10 and in deployed position in FIG. 3, comprises an aerial/reflector assembly 41 mounted on a frame 43 which pivots on an axis 45 which is in turn supported by a framework 47 rotatably mounted on a rotary joint 49 about a vertical axis. The frame 47 and the aerial assembly 41 rotate as a whole through 360° and thus cover the complete azimuth range. A restricted elevation range is indicated in FIG. 10 by the broken lines of the aerial assembly 41 and the rear portions of the frame 43. The resulting coverage is shown in FIGS. 11a and 11b. FIGS. 11c and 11d show a rotodome 1 carried by a helicopter rather than a fixed-wing aircraft. In this case the radar scanner is integral with the radome 1, which rotates bodily about a vertical axis. The rotodome is symmetrical about this axis and therefore has a symmetrical radar coverage.

In addition to the S-band aerial/reflector assembly 41 of the scanner, other directional devices may be carried. For example a nodding X-band ground mapper and an IFF/ESM (Interrogation friend or foe/Electronic surveillance measures) array can be mounted on the back of the main aerial to scan in synchronism with it but 180° out of phase.

Figure 6:
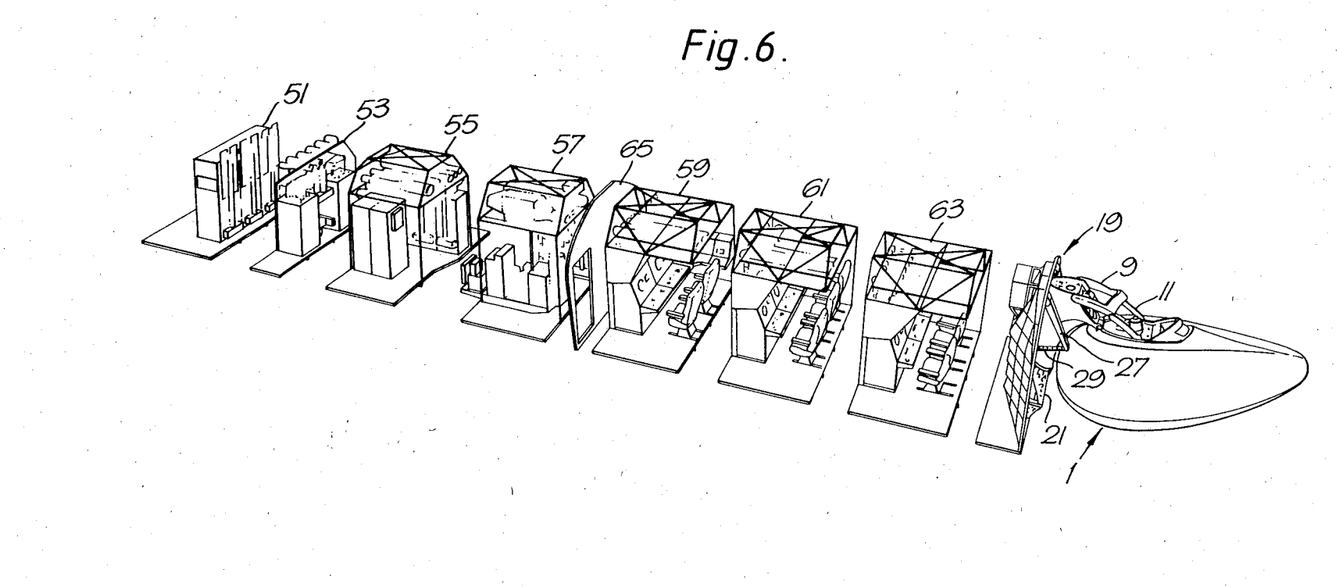
FIG. 6 is an exploded perspective view of the complete AEW system.

It has been realised that the adoption of a single scanner which can be deployed and retracted through the rear loading aperture permits the integration of substantially the whole A.E.W. system for loading and unloading as a unit into a suitable transport aircraft. FIG. 6 shows the separate sections of the system. These incorporate all of the standard requirements of an A.E.W. system on a modular basis.

Modules 51 and 53 comprise communications equipment for air-to-air, air-to-ground, air-to-surface communication and employs clear and encrypted voice signals, digital/encrypted data, multi-band frequency capability. These modules also include spares for replacement in flight.

Module 55 comprises transmitter control, integrated data processor, IFF signal processor, ESM equipment, scanner control for steering, stabilising and sequencing the radar scanner, and a heat exchanger for cooling the equipment generally.

Module 57 comprises radar signal processors for target echo analysis in conjunction with the IDP of module 55, aerial tuning unit, further heat exchanger, and header tanks for cooling liquid.

Modules 59, 61 and 63 include multi-function display and control consoles, communications control panel, IFF control panel and a program load unit to input from a cassette mission information at the beginning of a flight.

Module 19, already mentioned, comprises the pressure bulkhead on which the scanner pod and deployment mechanism are mounted, together with the microwave receiver and amplifiers.

Finally, not shown in FIG. 6 but a desirable extra, would be one or more rest area modules for the crew. All of the modules are mounted on individual pallets which interlock to form a unitary assembly. Such an assembly would be of excessive rigidity in relation to that of the airframe and consequently it is desirable to provide some softening of the construction by limited resilient articulation of the module couplings. The assembly is then mounted on a road transporter for transport to, and for loading on to, a transport aircraft. The assembly is rolled into the aircraft through the rear door aperture and fixed into position. The pressure bulkhead 19 is fixed and sealed across the fuselage at a suitable section just forward of the door aperture. It will be clear that this bulkhead allows use of the equipment in a pressurised aircraft while the scanner and its retraction mechanism operate at atmospheric pressure.

The assembled unit would generally require only the provision of power and cooling supplies to make it completely operational. It can therefore be tested and used without the aircraft, for training purposes. After fitting the assembly to an aircraft the new doors and door frame are fitted as a unit.

The particular configuration of the assembly can be adjusted to some extent to suit the intended user's requirements and also to provide some adjustment of the position of the centre of gravity within the aircraft. Thus the modules may be interchanged and may individually be adapted to suit requirements.

The facility provided by the integrated assembly and testing outside the aircraft enables an enormous reduction to be made in the conventional time for which an aircraft is out of use for the fitting of an A.E.W. system. It also means that aircraft do not have to be dedicated to the A.E.W. function but can have the complete unit installed as and when required.

A number of variations in the scheme described above are possible. It may, for example be possible to operate without the replacement doors, or even with the clam type doors, if the increased drag can be tolerated. Again, in an un-pressurised aircraft, or if pressurisation is sacrificed by restricting the altitude ceiling to, say, 3500 meters, the framework on which the scanner assembly is mounted does not have to be a pressure bulkhead.

It is envisaged that the above A.E.W. system is suitable or potentially suitable for a number of aircraft including the C130 Hercules, C160 Transall, Antonov An-12, Aeritalia G-222, De Havilland Canada DHC-5, and Kawasaki C-1. The size of the assembly may have to be restricted in several of these examples but no sacrifice of principle is required.

Figure 7:
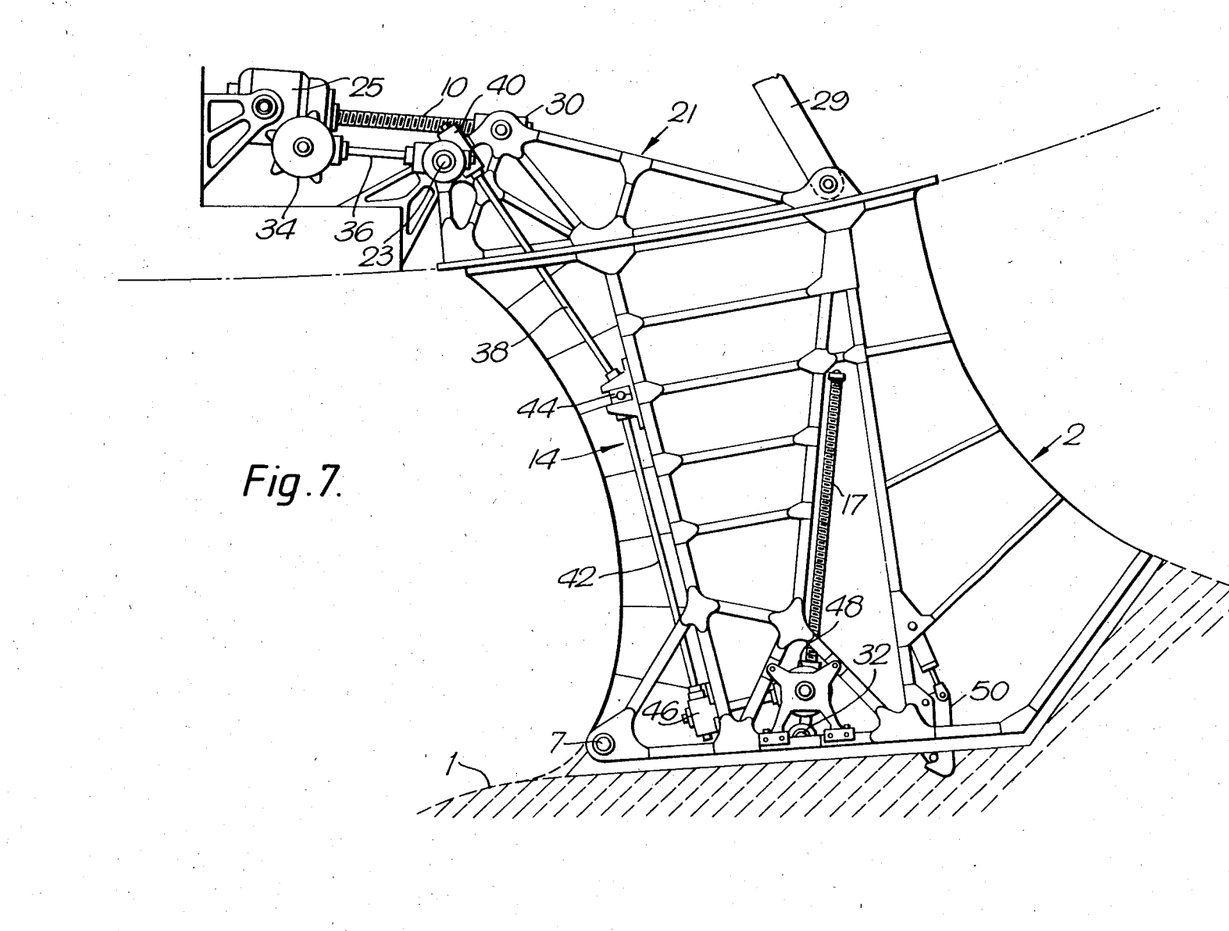
FIG. 7 is a schematic side elevation of the pod and pylon showing the driving mechanism.

FIG. 7 shows in more detail the drive mechanism of FIG. 3. Torque motor 25 drives primary leadscrew 10 which engages a nut 30 pivotally mounted on pylon support 21 of pylon 2 and thereby pivotally extends or retracts the pylon from the fuselage. An articulated coupling assembly 14 is ganged to leadscrew 10 and transmits power from torque motor 25 to secondary leadscrew 17 which engages pod 1 at pivot 32 and thereby rotates it about axis 7 relative to pylon 2. The ganged drive ensures that the orientation of pod 1 is maintained during deployment and retraction. Articulated coupling assembly 14 comprises a gearbox 34 which drives a shaft 36, a shaft 38 driven by shaft 36 via a rotary gear coupling 40, a shaft 42 driven by shaft 38 via a flexible coupling 44 and a right-angle gearbox 46 which transfers drive to a secondary screw drive assembly 48. A latch 50 is hydraulically actuated to lock the pod 1 in position against the pylon 3.

Figures 8A, 8B:
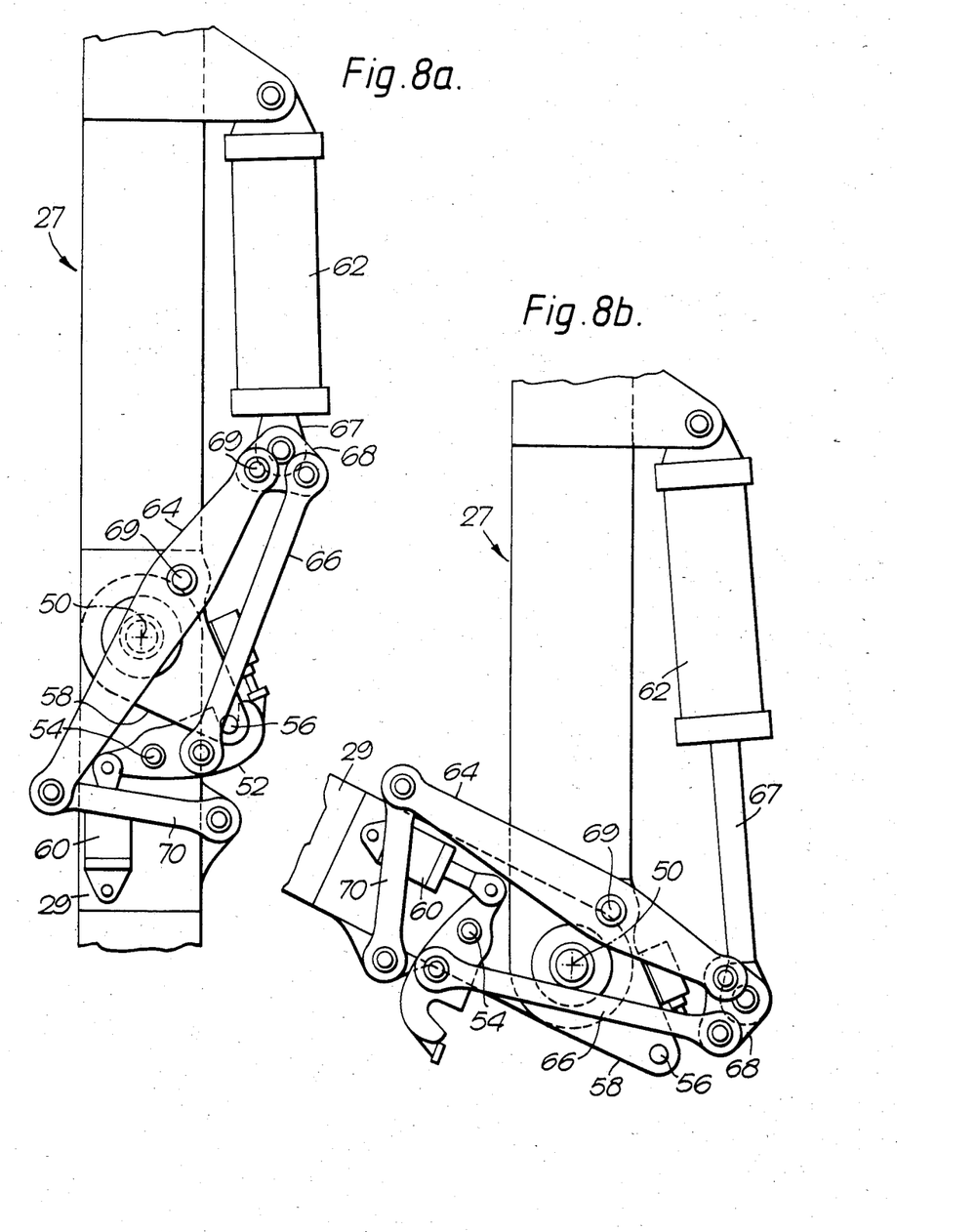
FIGS. 8a and 8b are schematic side views of a toggle-breaking mechanism for folding a toggle linkage shown in FIG. 3.

FIG. 8 shows in detail the toggle-breaking mechanism 20 of FIG. 3. Struts 27 and 29 are hinged at 50 and are locked in position (FIG. 8a) by a downlock latch 52 which is pivotally mounted on strut 29 at 54 and engages a locking pin 56 which extends from a projection 58 of strut 27. A latch spring 60 biases latch 52 against pin 56. The toggle linkage 27,29 is unlocked by means of a hydraulic actuator 62 which is connected to a strut-breaking linkage 64 and a downlock release linkage 66 by a swinging link 68. Extension of the actuator arm 67 initially swings linkage 68 about axis 69 (FIG. 8a) and releases pin 56. Linkage 64 then pivots about axis 69 and pulls on linkage 70 to swing strut 29 towards the position shown in FIG. 8b. It will be appreciated that only a slight degree of movement of struts 27 and 29 will be necessary before they can be folded to the position shown in FIG. 8a by forcing together their free ends by means of torque motor 25 and lead screw 10 (FIG. 3).

Figures 9A, 9B:
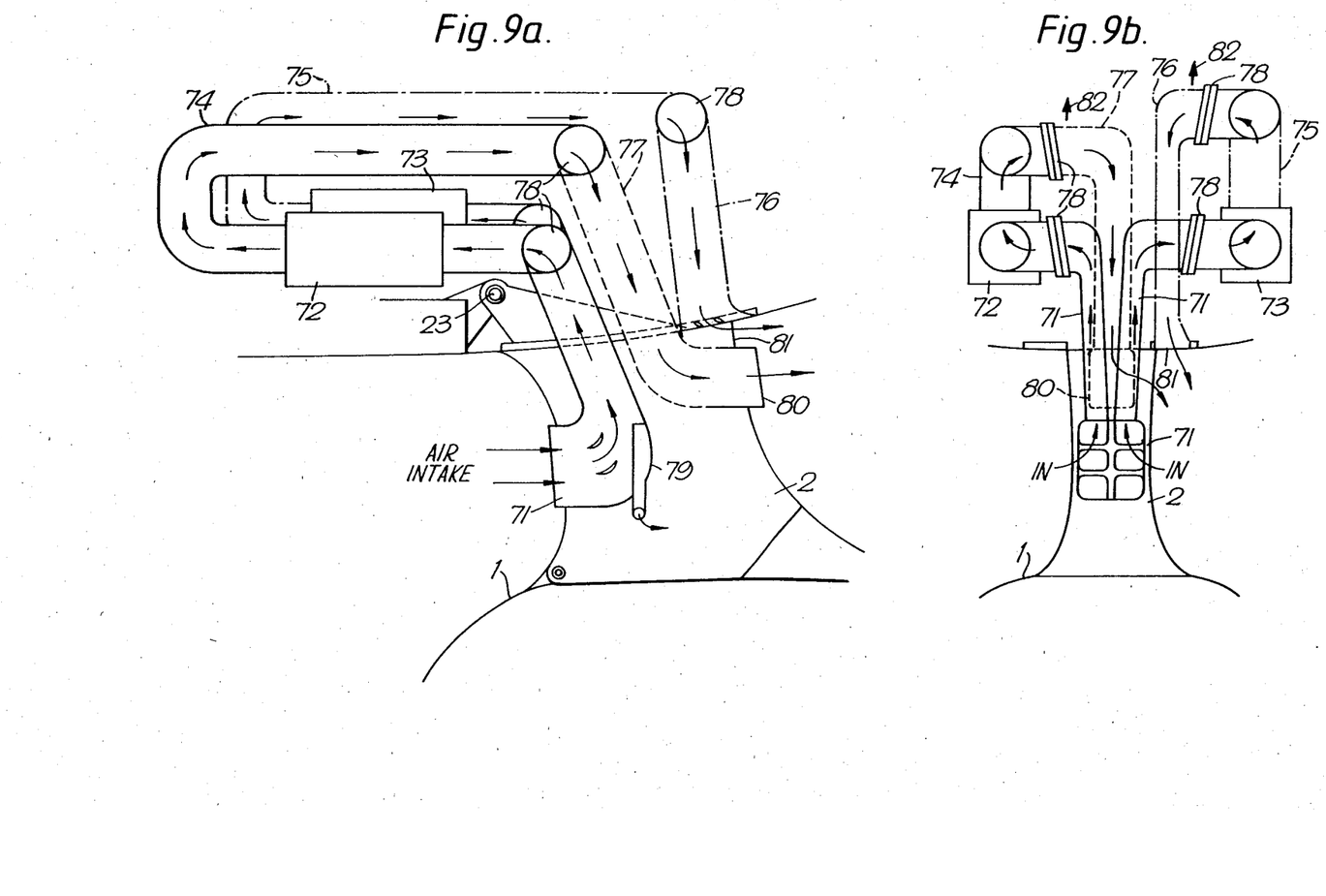

FIG. 9 shows schematically a power and cooling system incorporated in the pylon which may be used as a prefered alternative to the blisters 8 in FIGS. 3, 4 and 5. It will be appreciated that the normal power and cooling requirements of a cargo aircraft will be adequately met by its own cooling and power systems when carrying a radome pod in its retracted position. Cooling and power for the radar will only be required when the pod is deployed. Furthermore, any auxiliary power unit mounted on an aircraft will cause drag even when not in use. Accordingly, FIG. 9 shows a pylon-mounted ducting system which is exposed only when the pod is deployed. The system comprises an air intake 71 which feeds air to an air-liquid heat exchanger 72 in flight. The hot air from the heat exchanger then flows through ducts 74 and 77 to exhaust 80. Similarly, intake 71 feeds an airborne power unit 73 (essentially an air-driven turbine connected to a generator), the exhaust air from power unit 73 escaping through ducts 75 and 76 to exhaust 81. A centrifugal separator 79 removes any solid particles from the inlet air stream. Inlets 71 and ducts 76 and 77 are fixed to the pylon 2 and therefore pivot with it, whereas heat exchanger 72, power unit 73 and ducts 74 and 75 are fixed within the aircraft fuselage. Separable duct seals 78 permit inlet 71 and ducts 76 and 77 to move upward as indicated by arrows 82 when the pylon 2 is withdrawn into the fuselage.

We claim:

1. A radar scanner unit mounted in an aircraft having an elongated fuselage including means defining a first enclosed volume and means defining a second enclosed volume, said second enclosed volume being rearward of said first enclosed volume and being provided with a cargo-loading-aperture, said radar scanner unit comprising:

(a) a supporting framework fixed to said means defining said second enclosed volume;

(b) an aerodynamic pylon pivotally mounted for rotatable movement on and relative to said supporting framework about a first axis transverse to the axis of elongation of said fuselage, said pylon being pivotal between a deployed position in which it projects downwardly from the bottom of the fuselage and a retracted position in which it is received in the second enclosed volume;

(c) first drive means connected between said supporting framework and said pylon for effecting pivotal deployment and retraction of said pylon out of and into the means defining the second volume, respectively, through the cargo-loading-aperture;

(d) an aerodynamic radome pod pivotally mounted for rotatable movement on and relative to said pylon, said pod being elongated in a direction generally parallel to the direction of elongation of the fuselage;

(e) second drive means connected between said pylon and said radome pod for effecting pivotal deployment and retraction of said radome pod relative to said pylon about a second axis transverse to said fuselage;

(f) ganging means coupling said first and second drive means for deploying and retracting said pylon and said radome pod in unison;

(g) said ganging means maintaining an approximately constant aerodynamic attitude of said radome pod as it is deployed through said cargo-loading-aperture out of said means defining said second enclosed volume and retracted through said cargo-loading-aperture into said means defining said second volume.

2. A radar scanner unit as claimed in claim 1, including an articulated linkage connected between said supporting framework and said pylon, said articulated linkage locking said pylon in the deployed position.

3. A radar scanner unit as claimed in claim 2, including a further articulated linkage connected between said pylon and said radome pod, said further articulated linkage consisting of an articulated waveguide.

4. A radar scanner unit as claimed in claim 1, wherein said supporting framework incorporates a pressure bulkhead for isolating the means defining the first volume and permitting the scanner unit to operate at atmospheric pressure.

5. A radar scanner unit according to claim 1, wherein said cargo-loading-aperture is provided with doors which mate with said pylon when said radome pod is deployed to form a continuous aerodynamic surface therewith.

6. An airborne early warning system comprising:

(i) A radar scanner unit, said radar scanner unit comprising:

(a) a supporting framework for fixing to a section of an elongated aircraft fuselage including a means defining a volume having a cargo-loading-aperture;

(b) an aerodynamic pylon pivotally mounted for rotatable movement on and relative to said supporting framework about an axis transverse to the longitudinal axis of said fuselage for pivotal movement from a deployed position projecting from below the bottom of the fuselage to a retracted position within the means defining a volume;

(c) first drive means connected between said supporting framework and said pylon for effecting pivotal depolyment and retraction of said pylon out of and into the means defining a volume, respectively, through the cargo-loading-aperture;

(d) an aerodynamic radome pod pivotally mounted for rotatable movement on and relative to said pylon, said pod being elongated parallel to said fuselage;

(e) second drive means connected between said pylon and said radome pod for effecting pivotal deployment and retraction of said radome pod relative to said pylon; and (f) ganging means coupling said first and second drive means for deploying and retracting said pylon and said radome pod in unison;

(g) said ganging means maintaining an approximately constant aerodynamic attitude of said radome pod as it is deployed and retracted out of and into said means defining said volume, respectively, through said cargo-loading-aperture;

(ii) said airborne early warning system further comprising a plurality of personnel and equipment housing modules for the energization of said radar scanner unit and the processing of information derived from it; and (iii) means for coupling said modules and said radar scanner unit together as an integral unit for loading through the cargo-loading-aperture of an aircraft, fixing said supporting framework to the means defining a volume and deploying said radome pod through said cargo-loading-aperture selectively.

7. An airborne early warning system according to claim 6, wherein said means for coupling have limited flexibility to permit said integral unit to conform to the flexing of the fuselage in flight.

* * * * *